United States Patent [19]

Saylor

[11] Patent Number: 5,614,292

[45] Date of Patent: Mar. 25, 1997

[54] THERMAL WALKWAY COVER HAVING CARBONIZED RUBBER

[76] Inventor: Steven Saylor, Evergreen Studio Box 204, 400 Main St., Dayton, Nev. 89403

[21] Appl. No.: 573,906

[22] Filed: Dec. 18, 1995

Related U.S. Application Data

[63] Continuation of Ser. No. 335,250, Nov. 7, 1994, abandoned.

[51] Int. Cl.⁶ ........................................... B32B 9/00
[52] U.S. Cl. ................. 428/209; 428/192; 428/408; 428/373; 428/457; 428/81; 428/53; 428/52; 428/47; 428/908.8; 219/528; 219/546; 219/547; 219/548; 37/227; 219/213
[58] Field of Search .................... 428/192, 408, 428/373, 457, 81, 53, 52, 47, 908.8; 219/528, 546, 547, 213; 37/227

[56] References Cited

U.S. PATENT DOCUMENTS

| | | | |
|---|---|---|---|
| 4,247,756 | 1/1981 | Cucinotta | 219/528 |
| 4,403,009 | 9/1983 | Onderak | 428/159 |
| 4,817,707 | 4/1989 | Aoyama | 165/46 |
| 5,380,988 | 1/1995 | Dyer | 219/528 |

Primary Examiner—Patrick Ryan
Assistant Examiner—Patrick Jewik
Attorney, Agent, or Firm—Armstrong, Westerman, Hattori, McLeland & Naughton

[57] ABSTRACT

A thermal walkway cover comprises at least three laminated layers including a middle layer of electrically conductive carbonized rubber, a durable, waterproof, UV-resistant top layer, and an insulating, waterproof bottom layer. Means are provided in to form of electrically conductive strips embedded in the middle layer to heat the middle layer. Connections are provided to a power source. The cover may have one or more edges of a dovetail construction so that cover sections or modules may be connected together to cover a desired walkway area, in which case electrical connections are provided between individual modules.

9 Claims, 2 Drawing Sheets

THERMAL WALKWAY COVER HAVING CARBONIZED RUBBER

This is a continuation of application Ser. No. 08/335,250 filed Nov. 7, 1994 now abandoned.

BACKGROUND

FIELD OF THE INVENTION

This invention relates to a year around, non-slip, thermostatically controlled, radiant heated, layered flexible mat to prevent snow buildup and icing of walkways.

SUMMARY OF THE INVENTION

The invention provides a non-slip, electrically powered, radiant heated, layered mat for covering outdoor walkways, having a top layer of non-slip, waterproof, UV-resistant rubber or plastic, a middle layer of carbonized rubber or of rubber or plastic with embedded electrical wiring, and a bottom insulating layer of closed cell rubber or plastic.

DESCRIPTION OF PREFERRED EMBODIMENTS

Figure 1:
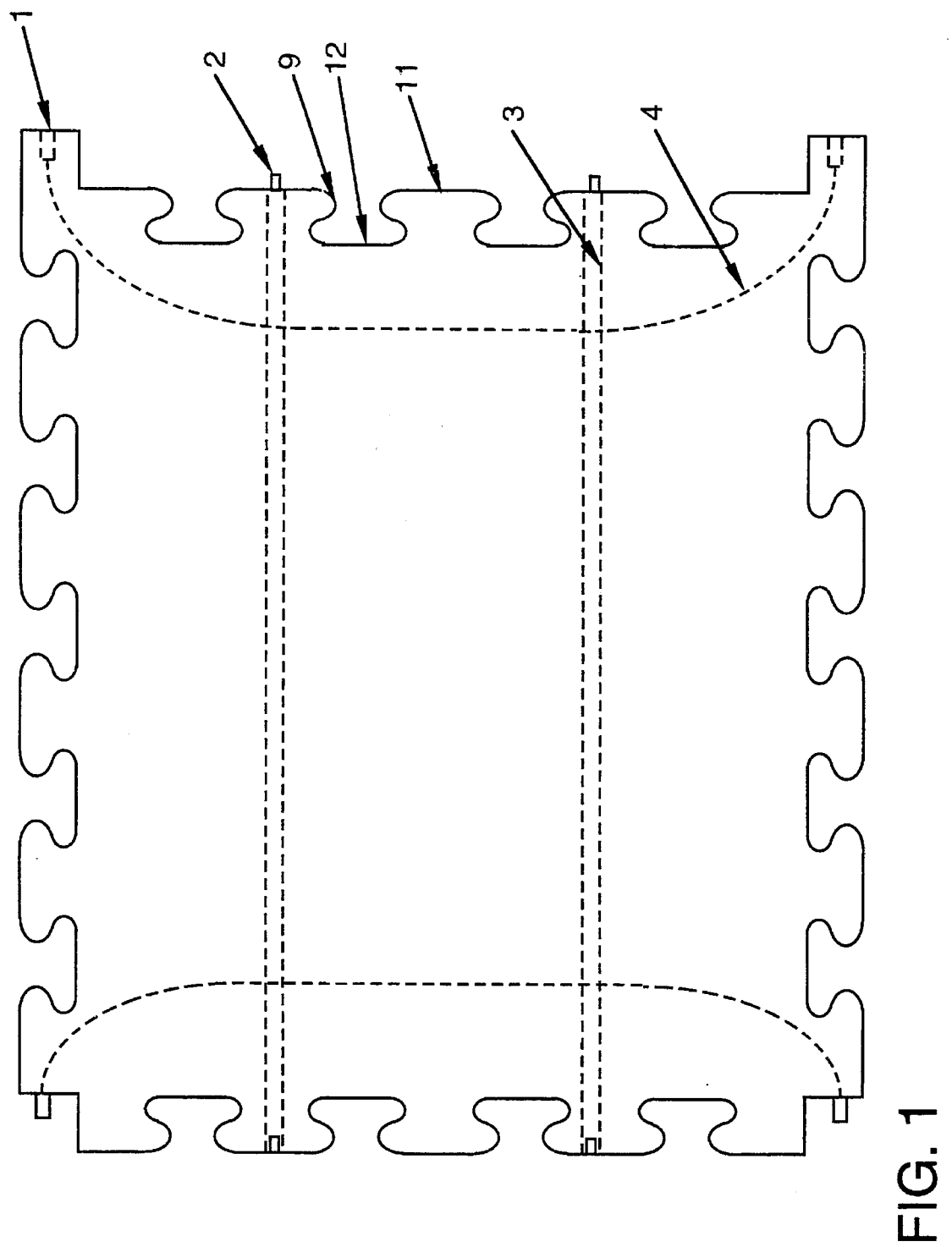
FIG. 1 is a top plan view of the thermal walkway cover showing electrical components and interlocking dovetail edge treatment.

In FIG. 1, the numeral 9 generally denotes a section or module of the thermal walkway cover. Cover 9 has, on all four sides thereof interlocking dovetail projections 11 and slots 12, allowing the sections or modules to be connected together in an interlocking manner, if desired to cover an area of a particular size. A watertight receptacle for electrical connection to an AC power source is denoted by the numeral 1. A control unit of standard type (not shown) is provided between receptacle 1 and the power source to control the current to the thermal walkway cover. The numeral 2 denotes a watertight blade plug for electrical connection between mat sections or modules. Copper braided strapping 3 conducts electrical current to a carbonized rubber middle layer 6 (FIG. 2), thereby generating heat within the carbonized rubber layer. An electrical supply wire 4, e.g. of nickel-chromium, is provided between power source connections 1 and copper strapping 3.

Figure 2:
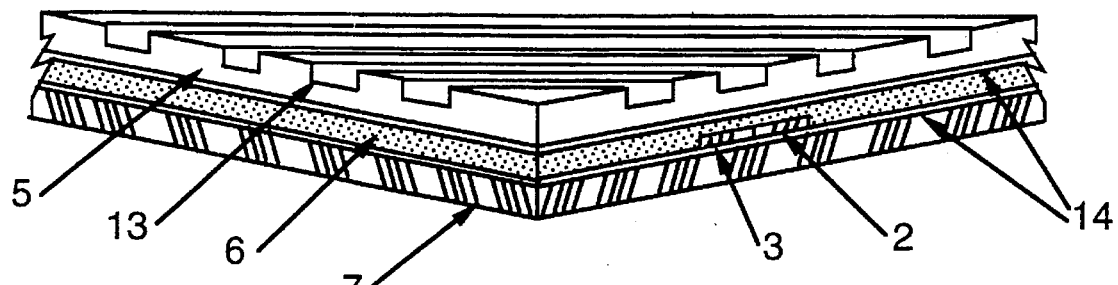
FIG. 2 is a side elevation in cross-section showing electrical features of the invention.

FIG. 2, a cutaway sectional view of the thermal walkway cover, shows three layers laminated together. A top layer 5 is a durable, non-slip, UV-resistant rubber or plastic, such as vinyl, with raised surface creating drainage channels 13 across the surface, to drain water from the mat surface. As above noted, a middle layer 6 is a carbonized, electrically conductive rubber, with embedded flat copper braided strapping, and provided with watertight electrical connectors 1 and 2 and wire 4 to electrify the carbonized, electrically conductive rubber layer 6 and generate enough radiant heat to warm the top layer 5. The middle layer may comprise a non-conductive rubber or plastic material in which are embedded resistant-type electrical heating elements such as wires. Thermal sensors (not shown) also may be provided. A bottom layer 7 is an insulating, waterproof, closed cell rubber, designed to prevent radiant heat from the middle layer from penetrating into the ground.

As also shown in FIG. 2, the composite body 9 may also contain layers 14 of thin electrically conductive metal foil, such as copper, to help eliminate hot spots where connectors 1 and 2 are attached to the middle layer 6. In such case, the foils are soldered to the electrical supply at the respective connectors.

Figure 3:
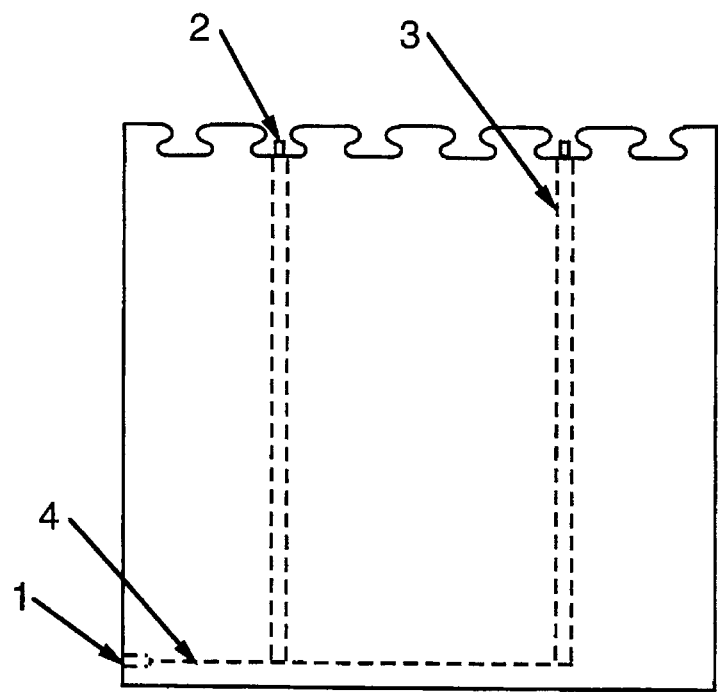
FIG. 3 is a top plan view of a starter section or module of the thermal walkway cover showing the power supply.

FIG. 3 shows a starter section or module with interlocking dovetail connectors on one side only, receptacle 1 for connection to the power source, plug 2 for connection between modules, copper braided strapping 3, and Ni—Cr electrical supply wire 4.

What is claimed is:

1. A thermal walkway cover comprising a plurality of flat, modules having interlocking opposed edges and adapted to cover a predetermined walkway area, each module comprising a plurality of laminated flexible layers including a top layer having water drainage channels formed in an upper surface thereof and made of a material selected from the group consisting of durable, non-slip UV-resistant plastics and rubbers, a bottom layer made of a material selected from the group consisting of insulating and waterproof plastics and rubbers, and at least one intermediate layer between the top and bottom layers comprising an electrically heatable inner layer of conductive carbonized rubber, a plurality of elongated flexible electrical conductors embedded in the inner layer, each of said conductors extending across an associated module to a pair of opposed edges thereof and adapted to electrify the carbonized rubber inner layer of that module, an electrical supply line embedded in the inner layer and connecting each of the electrical conductors to the other conductors in the same module, a plurality of first watertight electrical connector plugs disposed at and projecting from one of said opposed edges of each module and respectively connected to an end of each of said conductors terminating at said one edge of that module, a corresponding plurality of first electrical receptacles disposed at and extending inwardly of the other of said opposed edges of each module and connected to the other ends of said conductors in that module and adapted for mating with corresponding plugs on an adjacent module when the modules are disposed in edge-to-edge relationship, thereby to connect the electrical conductors of each module to the electrical conductors of an adjacent module, a plurality of second electrical plugs and second electrical receptacles disposed respectively at opposite ones of said opposed edges of each module to connect the electrical supply line and the electrical conductors of each module to a power source, whereby, when the modules are electrically connected together in said edge-to-edge relationship and to the power source, heat is generated in the carbonized rubber inner layer of each module and passes through the top layer of the module and the cover thereby serves to prevent buildup of ice and snow on a walkway area covered by the thus-disposed modules.

2. A cover according to claim 1, wherein the top layer is a polyvinyl chloride and the bottom layer is a closed cell rubber.

3. A cover according to claim 1, wherein the top layer is a rubber and the bottom layer is a closed cell rubber.

4. A cover according to claim 1, wherein the carbonized rubber layer further comprises a plurality of heating element strips.

5. A cover according to claim 4, wherein the heating element strips comprise copper braided strapping.

6. A cover according to claim 1, wherein the cover is in the form of a module having a plurality of heating elements for heating the inner layer and at least one edge of the cover is of dovetail construction whereby a plurality of cover modules can be interlocked together.

7. A cover according to claim 4, wherein the cover is in the form of a module and at least one edge of the cover is of dovetail construction whereby a plurality of cover modules can be interlocked together.

8. A thermal walkway cover according to claim 4, wherein the cover further comprises electrically conductive metal foil layers juxtaposed to top and bottom surfaces of the inner layer to eliminate hot spots where electrical connections are made to the inner layer.

9. A method of preventing snow buildup an icing of a walkway comprising the step of using the thermal walkway cover of claim 1 to melt ice and snow.

* * * * *